United States Patent
Reddy et al.

(10) Patent No.: US 8,774,763 B2
(45) Date of Patent: *Jul. 8, 2014

(54) APPARATUS AND METHOD OF CIPHERING IN WIRELESS TELECOMMUNICATIONS USER EQUIPMENT OPERATIVE WITH A PLURALITY OF RADIO ACCESS NETWORKS

(75) Inventors: Giri Narayana Reddy, Birmingham (GB); Andrew Farnsworth, Marlbrook (GB)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,759

(22) Filed: Jul. 10, 2012

(65) Prior Publication Data

US 2013/0012163 A1     Jan. 10, 2013

Related U.S. Application Data

(63) Continuation of application No. 12/179,728, filed on Jul. 25, 2008, now Pat. No. 8,244,290.

(51) Int. Cl.
*H04M 1/66* (2006.01)
*H04M 1/68* (2006.01)

(52) U.S. Cl.
USPC ..... 455/410; 455/411; 455/432.1; 455/432.2; 455/432.3; 455/425; 455/552.1

(58) Field of Classification Search
USPC ........ 455/410, 411, 432.1, 432.2, 432.3, 425, 455/552.1
See application file for complete search history.

(56) References Cited

U.S. PATENT DOCUMENTS

| | | | |
|---|---|---|---|
| 6,643,513 B2 | 11/2003 | Timonen et al. | |
| 7,065,340 B1 | 6/2006 | Einola et al. | |
| 7,233,671 B2 | 6/2007 | Wu | |
| 8,412,157 B2 * | 4/2013 | Wang et al. | 455/411 |
| 8,509,437 B2 * | 8/2013 | Kubota | 380/257 |
| 2003/0031322 A1 * | 2/2003 | Beckmann et al. | 380/278 |
| 2004/0228491 A1 | 11/2004 | Wu | |
| 2007/0072635 A1 | 3/2007 | Zhao et al. | |
| 2008/0096530 A1 * | 4/2008 | Kuo | 455/411 |
| 2009/0119190 A1 | 5/2009 | Realini | |

FOREIGN PATENT DOCUMENTS

EP     1915022 A1     4/2008

OTHER PUBLICATIONS

3GPP TS 25.331 v5.19.0 (Dec. 2006), full specification.

(Continued)

*Primary Examiner* — Wen Huang
(74) *Attorney, Agent, or Firm* — Novak Druce Connolly Bove + Quigg LLP

(57) ABSTRACT

A method in a wireless telecommunications device operative with a plurality of radio access networks, the method comprising: when operating with a first radio access network reading at least one ciphering variable applicable in the second radio access network (e.g. in UMTS reading the value of a variable START from the USIM of the device). When at least one ciphering variable applicable in the second radio access network renders ciphering in the second radio access network infeasible without further authentication (e.g. in UMTS when the value of START in USIM is equal to a value THRESHOLD), using a substitute value for the ciphering parameter (e.g. START) when establishing a connection with the second radio access network.

14 Claims, 5 Drawing Sheets

(56) References Cited

OTHER PUBLICATIONS

The 3GPP technical standard "Universal Mobile Telecommunications System (UMTS); Radio Resource Control (RRC); Protocol specification (3GPP TS 25.331 version 7.9.0 Release 7); ETSI TS 125 331" ETSI Standard, European Telecommunications Standards Institute (ETSI), Sophia Antipolis Cedex, France, vol. 3-R2, No. V7.9.0, Jul. 10, 2008, XP002530637.

* cited by examiner

APPARATUS AND METHOD OF CIPHERING IN WIRELESS TELECOMMUNICATIONS USER EQUIPMENT OPERATIVE WITH A PLURALITY OF RADIO ACCESS NETWORKS

CROSS-REFERENCE TO RELATED APPLICATION

This application is a continuation of U.S. application Ser. No. 12/179,728, filed Jul. 25, 2008, now issued as U.S. Pat. No. 8,224,290, said application is incorporated by reference in its entirety.

BACKGROUND

1. Technical Field

This application relates to mobile telecommunications systems in general, having particular application in UMTS (Universal Mobile Telecommunications System) in general, and in particular relates to an apparatus and method of ciphering in wireless telecommunications user equipment operative with a plurality of radio access networks.

2. Description of the Related Art

In a typical cellular radio system, a wireless telecommunication device communicates via one or more radio access radio networks (RANs) to one or more core networks. In UMTS system such devices are typically referred to as User Equipment (UE) and in GSM such devices are typically referred to as Mobile Stations (MS). Such devices comprise various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS, GSM and to particular standards. However it should be understood that the invention is not intended to be limited to any particular mobile telecommunications system.

A radio access network covers a geographical area typically divided into a plurality of cell areas. Each cell area is served by at least one base station, which in UMTS may be referred to as a Node B. Each cell is typically identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

GSM is a so-called second generation public land mobile telecommunications system. UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

In telecommunications, typically ciphering is used to reduce the likelihood of unauthorised interception and examination of the content of data transmitted between the mobile device and the network. Signalling protocols are typically used to set up ciphering within radio connections and ciphering information is transmitted between the wireless communications device and the network. Issues may arise when a wireless telecommunications device handovers during a call from operating with a first radio access network to a second radio access network. For instance, the ciphering protocol used in the first radio access network may not be appropriate for the second radio access network.

There are thus proposed strategies for apparatus and a method of ciphering in wireless telecommunications devices operative with a plurality of radio access networks. A number of such strategies are detailed below.

Other aspects and features of the proposed strategy will become apparent to those ordinarily skilled in the art upon review of the following description of specific embodiments of apparatus and methods of ciphering in wireless telecommunications user equipment operative with a plurality of radio access networks.

BRIEF DESCRIPTION OF THE DRAWINGS

Embodiments will now be described, by way of example only, with reference to the attached drawings, in which.

The same reference numerals are used in different figures to denote similar elements.

DETAILED DESCRIPTION OF THE DRAWINGS

An apparatus and method of ciphering in a wireless telecommunications device operative with a plurality of radio access networks are described. In the following description, for the purposes of explanation, numerous specific details are set forth in order to provide a thorough understanding of the present invention. It will be apparent, however, to one skilled in the art that the technique may be practised without these specific details. In other instances, well-known structures and devices are shown in block diagram form in order to avoid unnecessarily obscuring the proposed method.

The needs identified in the foregoing Background, and other needs and objects that will become apparent from the following description, are achieved by, in one aspect, a method of ciphering in a wireless telecommunications device operative with a plurality of radio access networks. In other aspects, the invention encompasses apparatus and a computer-readable medium configured to carry out the foregoing actions. In particular, the method may be implemented in a mobile telecommunications device, with or without voice capabilities, or other electronic devices such as handheld or portable devices.

Figure 1:
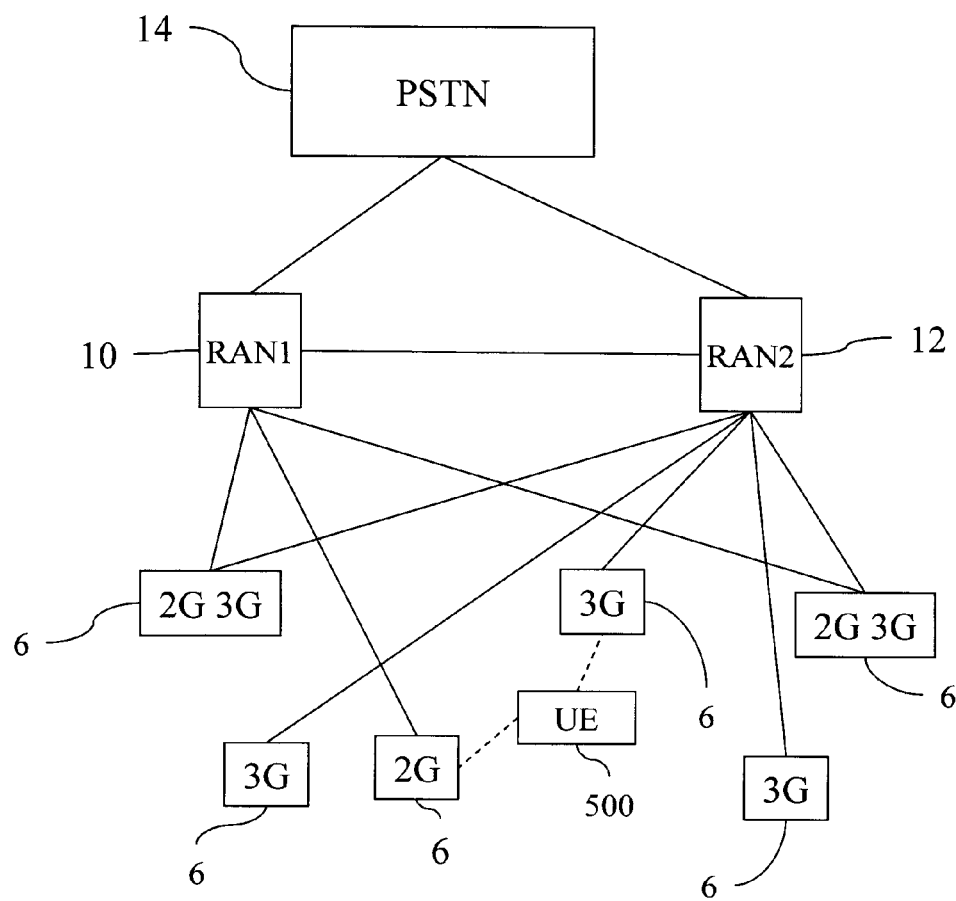
FIG. 1 shows an overview of two radio access networks and a wireless telecommunications device.

FIG. 1 shows an overview of a telecommunications network and a multimode wireless telecommunications device 500. Clearly in practice there may be many such devices operating with the network but, for the sake of simplicity, FIG. 1 only shows a single wireless telecommunications device 500. For the purposes of illustration, FIG. 1 also shows a network having a few components. It will be clear to a person skilled in the art that in practice a network will include far more components than those shown. Furthermore, FIG. 1 shows only two radio access networks. Again it will be clear to a person skilled in the art that typical mobile telecommunications set-up may involve more radio access networks and/or different radio access networks.

Across a geographical area, there may be one or more radio access networks (RANs), each operating according to a given standard. For the purposes of illustration, we will consider two radio access networks. The first radio access network and the second radio access network operate, again for purposes of illustration, according to the radio access technologies GSM and UMTS respectively. GSM and UMTS are typical second and third generation wireless telecommunications access technologies respectively. Typically each radio access network includes radio access devices 6 to provide the physical radio link between the wireless telecommunications device 500 and the rest of the radio access network. These radio access devices 6 are known as base stations in GSM and Node Bs in UMTS. Further components of the GSM radio access network are indicated by reference numeral 10 and comprise for example Mobile Switching Centres (MSCs), Base Station Controllers (BSCs), GSM Switching Centres, the GSM Core Network etc. Further components of the UMTS radio access network are indicated by reference numeral 12 and comprise for example Radio Network Subsystems (RNSs), Radio Network Controllers (RNCs), 3G mobile switching centres (3G MSC), 3G serving GPRS support nodes (3G SGSNs), the UMTS Core Network etc. Typically each radio access network is ultimately connected to a Public Switched Telephone Network (PSTN) 14.

Wireless telecommunications device 500 may be mobile within the radio access network. Radio connections (indicated by the straight dotted lines in FIG. 1) are established between the wireless telecommunications device and one or more of the radio access devices 6.

The radio access devices 6 (e.g. the GSM Base stations and the UMTS Node Bs) control one or more cells. Typically the radio access devices 6 are mounted high e.g. up a mast and may be co-located e.g. GSM base stations and UMTS Node Bs on the same mast. FIG. 1 shows some radio access devices 6 as being single mode (e.g. 2G or 3G only) and some as being dual mode (e.g. 2G and 3G). A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B may operate as more than one cell since it may operate at multiple frequencies and/or with multiple scrambling codes.

Consider a wireless telecommunications device 500 that is operative with a plurality of radio access technologies e.g. one that complies with the 3GPP specifications for the UMTS protocol and also complies with the specifications for the GSM network. The 3GPP 25.331 specification, v.5.19.0, incorporated herein by reference in its entirety and referred to herein as the 25.331 specification, addresses the subject of UMTS RRC (Radio Resource Control) protocol requirements between the UMTS Terrestrial Radio Access Network (UTRAN) and the wireless telecommunications device. The 3GPP 45.008 specification, v.5.22.0, incorporated herein by reference in its entirety, addresses the subject of GSM Radio subsystem link control protocol requirements between the GSM Terrestrial Radio Access Network and the wireless telecommunications device.

The wireless telecommunications device typically operates with a physically secure device, typically an IC card (or 'smart card'), that can be inserted and removed from the device. In UMTS this card is known as a Universal Integrated Circuit Card (UICC). The card may contain one or more applications. One of the applications may be a Universal Subscriber Identity Module (USIM), which is an application used for accessing services provided by mobile networks, on which the application is able to register with the appropriate security.

Ciphering and its implementation are set out at many points in the 3GPP specifications and a person skilled in the art of ciphering in the UMTS field would be familiar with this. For instance, one instance that relates to ciphering is clause 8.3.6.3 of the 25.331 specification, which relates to how a wireless telecommunications device handles handover to the UTRAN when operating with another radio access technology (RAT) (for example GSM, WiFi, cdma2000, GRPS, EDGE etc). Sections 8.1.3.3, 8.5.2 and 8.5.9 are also of interest.

In ciphering, typically a key is used to encrypt data to be transmitted. So that one device (for instance a wireless telecommunications device) and another (for instance the telecommunications network) can ensure that each is synchronized, ciphering data is sent between each based on ciphering parameters. Typical ciphering parameters include a ciphering key, which is used to encrypt/decrypt the data, as well as a counter number which typically is incremented each time data is encrypted. A ciphering key is typically a code used in conjunction with a security algorithm to encode and decode user and/or signalling data.

In UMTS, typical ciphering parameters include a ciphering key, a sequence number (SN), a hyperframe number (HFN) and a Radio Bearer (RB) number. The ciphering key is used to encrypt/decrypt the data. The sequence number (SN) is incremented each time a block of data is encrypted. The sequence number typically has a maximum value and when this is reached, the SN is reset, for instance to zero. The hyperframe number (HFN) is incremented each time the sequence number is reset. The Radio Bearer (RB) number indicates to which RB the ciphering is applicable. There is also a ciphering parameter known as START which is used to initialise the MSBs of HFNs.

When a wireless telecommunications device initiates a radio connection (for instance to establish a voice call or a data connection), the wireless telecommunications device reads from non-volatile memory of the device or from the Universal Subscriber Identity Module (USIM) of the resident smart card the value of a variable START. This is then used in the ciphering procedure. The wireless telecommunications device then overwrites the value of START (in the USIM or non-volatile memory of the device) with the value THRESHOLD stored in the variable START_THRESHOLD. At the end of a call, the wireless telecommunications device looks at the stored Hyperframe Numbers (HFNs) for each Radio Bearer and calculates a new value for START (for instance as set out in section 8.5.9 of the 25.331 specification). The value of START is then written to the variable known as START, stored in non-volatile memory of the device or on the USIM of the device if present. The UE also stores a variable START_THRESHOLD which has a value THRESHOLD. When, at the end of a call, the value of START is equal to or greater than the value of THRESHOLD, the value of START is not reset. Next time a UMTS call is made, the UE reads the value of START as being THRESHOLD. This may cause the ciphering authentication procedure to begin and the value of START is then reset, for instance to zero, However, if a wireless telecommunications device exits an RRC Connection abnormally it may leave the START value in the wireless telecommunications device or USIM set to THRESHOLD. This may happen for instance if the device crashes or the battery is removed during a call. If the wireless telecommunications device then camps on a cell of a network other than the UMTS network and then makes a call on that network, when the device tries to handover the call to UMTS network, the UMTS Security Mode Procedure will fail due to the START value being THRESHOLD.

There is therefore a problem for a multimode wireless telecommunications device when the device ends up with a ciphering parameter setting that means that ciphering cannot proceed in a network prior to an authentication procedure when an attempt is next made to handover a connection to that network.

There is therefore provided a method of ciphering in which a multimode wireless telecommunications device, when connected to a first radio access network and attempting to establish a connection with a second radio access network, examines at least one ciphering parameter for use with the second radio access network and, when at least one ciphering parameter would prohibit the device from applying ciphering in the second radio access network, sets the ciphering parameter to a default value such that ciphering may be applied.

Figure 2:
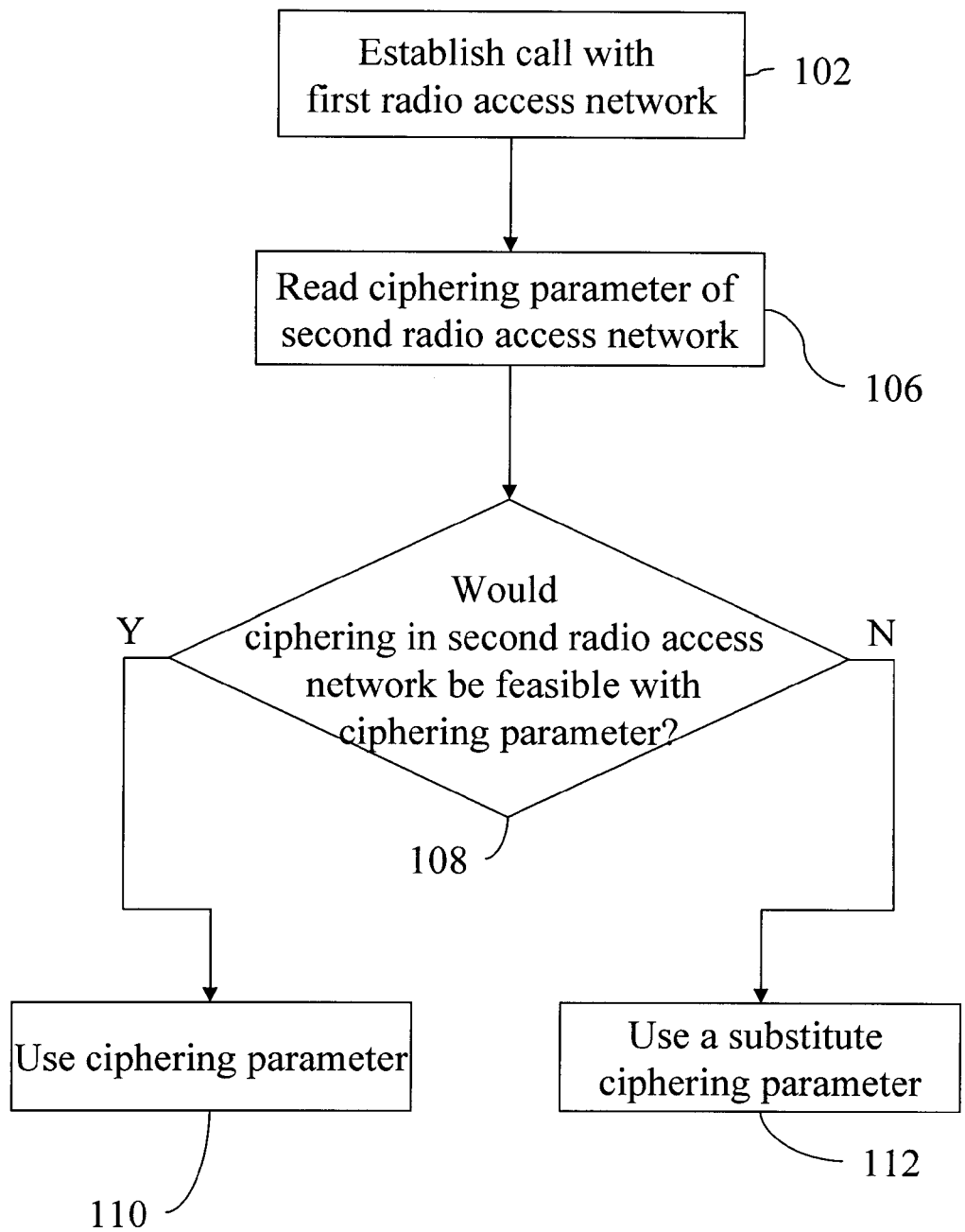
FIG. 2 is a flow diagram illustrating a first embodiment of a method applicable to a wireless telecommunications device operative with a plurality of radio access technologies.

FIG. 2 is a flow diagram illustrating a first embodiment of a method used by a wireless telecommunications device. First (102) a wireless telecommunications device operable with a plurality of radio access networks establishes a call with a first radio access network (for instance a call with a GSM network, a WiFi Network, a cdma2000 network, a GPRS network, an EDGE network etc.), the call with the first radio access network being ciphered. The wireless telecommunications device then reads (106) at least one ciphering parameter of the second radio access network. The wireless telecommunications device then determines (108) whether ciphering in the second radio access network would be feasible using the ciphering parameter. If so, the wireless telecommunications device uses the ciphering parameter (110). When the wireless telecommunications device determines (108) that ciphering in the second radio access network would be infeasible using the ciphering parameter, the wireless telecommunications device uses a substitute value for the ciphering parameter (112).

Thus a wireless telecommunications device, on handing over a ciphered call to the second radio access network, does not attempt to use a ciphering parameter that would mean that ciphering would not be enabled when operating with the second radio access network. Instead a substitute ciphering parameter is used.

Figure 3:
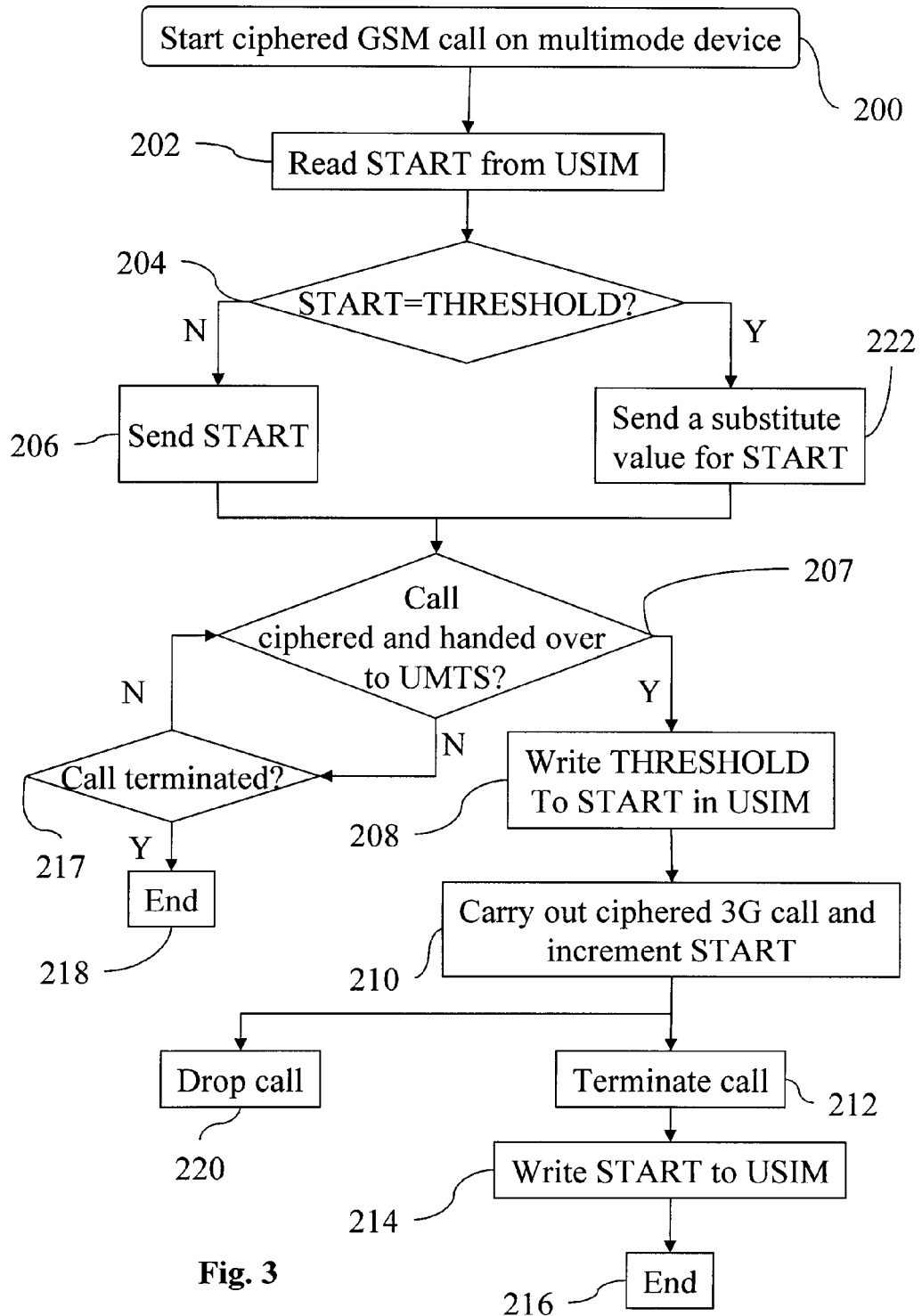
FIG. 3 is a flow diagram illustrating a second embodiment of a method applicable to a wireless telecommunications device operative with a plurality of radio access technologies.

FIG. 3 is a flow diagram illustrating one embodiment of the method when applied to UMTS radio access technology. In this embodiment, the presence of a USIM is assumed. However, as is well known from the 25.331 specification, a UMTS compliant device does not require a USIM and in the case of a USIM not being present the device stores values for START in non-volatile memory. Where it is stated that a value is stored in USIM a reader will understand that the value may alternatively be stored in memory of the device.

As shown in FIG. 3, a wireless telecommunications device operable with a plurality of radio access networks establishes a ciphered call with a first radio network (e.g. GSM, WiFi, cdma2000 etc) (200). The device then reads (202) the value of START, from the USIM or non-volatile memory of the device. If the value of START is not equal to THRESHOLD (204) then the multimode wireless telecommunications device sends the value of START to the network (206) and this value is used by the wireless telecommunications device for ciphering purposes in the UMTS network. The device then monitors (207) whether the call is ciphered and handed over to the UMTS network. When the device monitors that this is so, the device then writes the value of THRESHOLD into the variable for START in the USIM (208) (if available) or non-volatile memory of the device. The device then proceeds with the UMTS call, incrementing the value of START in the device in the usual manner (210). When the call is terminated in the approved manner (212), the device then calculates a new value for START based on HFNs and writes (214) the new value of START into the variable for START in the USIM or the non-volatile memory of the device (214). The device therefore has a record of the value of START achieved in the most recent call established by the wireless telecommunications device. The process then ends (216). Similarly if the call is never handed over to the UMTS network, then the process continues until the GSM call is terminated (217) and the process ends (218).

The START value is typically sent by the device to the first radio access network (in this case the GSM network) which then forwards the information to the second radio access network (in this case UMTS). In the case of the GSM network, the information may be sent to the network using the UTRAN_CLASS_MARK procedure.

The procedure described so far in relation to FIG. 3 is a procedure in which a call has been set up and terminated in an approved manner. However, when a UMTS call is dropped for some reason (220) then the value of the variable for START stored in the USIM or device is THRESHOLD. This is a value of START that may cause the initiation of an authentication procedure should a ciphered UMTS call be established with this in the USIM. The next time a call is established on the first radio access network (200) the multimode wireless telecommunications device reads from the USIM (202) the value of START. If the value of START is equal to THRESHOLD (204) then the multimode wireless telecommunications device sends a substitute value of START to the network (222) and this value is used by the wireless telecommunications device and UTRAN for ciphering purposes. On handover to the UMTS network (210), the device then proceeds with the UMTS call as before, writing the value of THRESHOLD into the variable for START (208) and incrementing the value of START in the device in the usual manner (210). When the call is terminated in the approved manner (212), the device then calculates a new value for START based on HFNs and writes (214) the new value of START into the variable for START in the USIM (214) or the non-volatile memory of the device. The USIM therefore has a record of the value of START achieved in the most recent call established by the wireless telecommunications device. The process then ends (216).

Sending a substitute value for START to the network allows the multimode wireless telecommunications device to start a call in the other radio access technology (e.g. GSM) and to handover the call to UMTS radio access technology even when the ciphering parameters stored on the USIM would mean that ciphering would not be feasible before an authentication procedure is carried out. The default value may be a constant (for instance 0000 0000 0000 0010 in binary) or may be calculated by the wireless telecommunications device according to a formula, for instance THRESHOLD minus y, where y is a randomly or pseudo randomly generated number comprising a positive integer in the range 1 to (THRESHOLD-1).

The method has been described with reference to handover of a call from a first radio access technology to UMTS radio access technology. However it will be appreciated by a person skilled in the art that the method has application to handover between other radio access technologies, in particular those that involve a threshold value that means that ciphering cannot be applied before further authentication has occurred.

Figure 4:
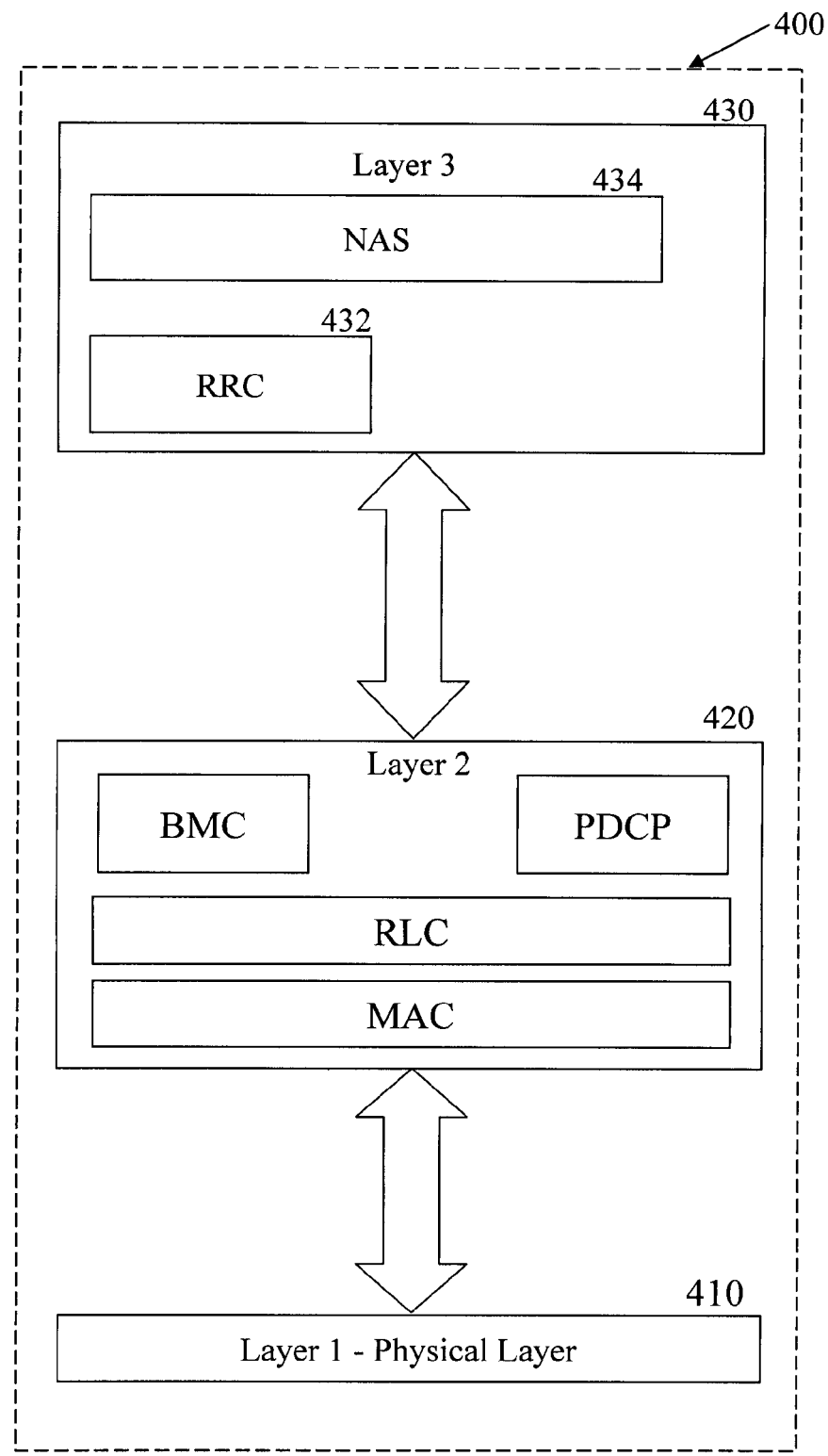
FIG. 4 is a block diagram illustrating an embodiment of a UMTS protocol stack apparatus provided with a RRC block, in accordance with the present application.

FIG. 4 is a block diagram illustrating an embodiment of a UMTS protocol stack provided in a wireless telecommunications device. A Radio Resource Controller (RRC) block 432 is a sub layer of Layer 3 430 of a UMTS protocol stack 400. The RRC 432 exists in the control plane only and provides an information transfer service to the non-access stratum NAS 434. The RRC 432 is responsible for controlling the configuration of radio interface Layer 1 410 and Layer 2 420. When the UTRAN wishes to change the configuration of the wireless telecommunications device it will issue a message to the wireless telecommunications device containing a command to invoke a specific RRC procedure. The RRC layer 432 of the wireless telecommunications device decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The strategies for ciphering in wireless telecommunications user equipment operative with a plurality of radio access networks as discussed above with reference to the drawings may be implemented by the RRC block 432.

Figure 5:
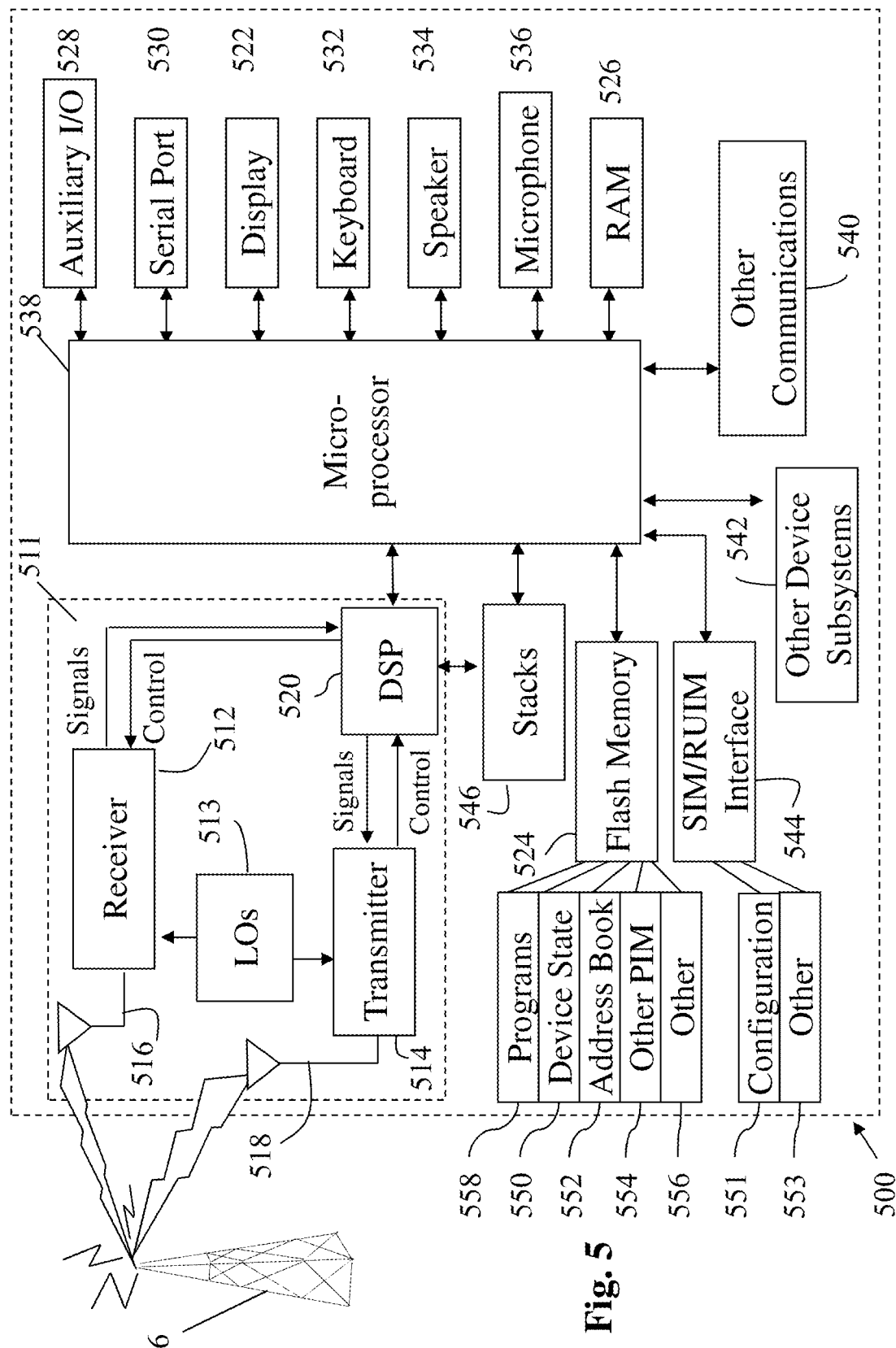
FIG. 5 is a block diagram illustrating a wireless telecommunications device.

Turning now to FIG. 5, FIG. 5 is a block diagram illustrating a wireless telecommunications device, which can act as a UE and implement the apparatus and methods of FIGS. 1 to 4. The wireless telecommunications device 500 (also known as a mobile station or UE) is preferably a two-way wireless communication device having at least voice and data communication capabilities. Mobile station 500 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 500 is enabled for two-way communication, it will incorporate a communication subsystem 511, including both a receiver 512 and a transmitter 514, as well as associated components such as one or more, preferably embedded or internal, antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication networks in which the device is intended to operate. For example, mobile station 500 may include a communication subsystem 511 designed to operate with a plurality of radio access networks such as the Mobitex™ mobile communication system, the DataTAC™ mobile communication system, GSM network, GPRS network, UMTS network, or EDGE network etc.

Network access requirements will also vary depending upon the type of network. For example, in the Mobitex and DataTAC networks, mobile station 500 is registered on the network using a unique identification number associated with each mobile station. In GSM, UMTS and GPRS networks, however, network access is associated with a subscriber or user of mobile station 500 and a smart card is provided to subscribers for insertion into the wireless telecommunications device. A GPRS mobile station therefore requires a subscriber identity module (SIM) card in order to operate on a GPRS network. Similarly a GSM wireless telecommunications device requires a subscriber identity module (SIM) card in order to operate on a GSM network and a UMTS wireless telecommunications device requires a universal subscriber identity module (USIM) card in order to operate on a UMTS network. Without a valid smart card, a wireless telecommunications device is unlikely to be fully functional. Local or non-network communication functions, as well as legally required functions (if any) such as "911" emergency calling, may be available, but mobile station 500 will be unable to carry out any other functions involving communications over the network. The mobile station 500 therefore includes a SIM interface 544, which is normally similar to a card-slot into which a card can be inserted and ejected like a diskette or PCMCIA card. The card has memory and holds many key configuration 551, and other information 553 such as identification, and subscriber related information as well as applications.

When required network registration or activation procedures have been completed, mobile station 500 may send and receive communication signals over the network. Signals received by antenna 516 through the communication network are input to receiver 512, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog conversion, frequency up conversion, filtering, amplification and transmission over the communication network via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile station 500 also includes a microprocessor 538 which controls the overall operation of the device. Communication functions, including at least data and voice communications, are performed through communication subsystem 511. Microprocessor 538 also interacts with further device subsystems such as the display 522, flash memory 524, random access memory (RAM) 526, auxiliary input/output (I/O) subsystems 528, serial port 530, keyboard 532, speaker 534, microphone 536, a short-range communications subsystem 540 and any other device subsystems generally designated as 542.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the microprocessor 538 is preferably stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Microprocessor 538, in addition to its operating system functions, preferably enables execution of software applications on the mobile station. A predetermined set of applications that control basic operations, including at least data and voice communication applications for example, will normally be installed on mobile station 500 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network. In a preferred embodiment, the PIM data items are seamlessly integrated, synchronized and updated, via the wireless network, with the mobile station user's corresponding data items stored or associated with a host computer system. Further applications may also be loaded onto the mobile station 500 through the network, an auxiliary I/O subsystem 528, serial port 530, short-range communications subsystem 540 or any other suitable subsystem 542, and installed by a user in the RAM 526 or preferably a non-volatile store (not shown) for execution by the microprocessor 538. Such flexibility in application installation increases the functionality of the device and may provide enhanced on-device functions, communication-related functions, or both. For example, secure communication applications may enable electronic commerce functions and other such financial transactions to be performed using the mobile station 500.

In a data communication mode, a received signal such as a text message or web page download will be processed by the communication subsystem 511 and input to the microprocessor 538, which preferably further processes the received signal for output to the display 522, or alternatively to an auxiliary I/O device 528. A user of mobile station 500 may also compose data items such as email messages for example, using the keyboard 532, which is preferably a complete alphanumeric keyboard or telephone-type keypad, in conjunction with the display 522 and possibly an auxiliary I/O device 528. Such composed items may then be transmitted over a communication network through the communication subsystem 511.

For voice communications, overall operation of mobile station 500 is similar, except that received signals would preferably be output to a speaker 534 and signals for transmission would be generated by a microphone 536. Alternative voice or audio I/O subsystems, such as a voice message recording subsystem, may also be implemented on mobile station 500. Although voice or audio signal output is preferably accomplished primarily through the speaker 534, display 522 may also be used to provide an indication of the identity of a calling party, the duration of a voice call, or other voice call related information for example.

Serial port 530 in FIG. 5 would normally be implemented in a personal digital assistant (PDA)-type mobile station for which synchronization with a user's desktop computer (not shown) may be desirable, but is an optional device component. Such a port 530 would enable a user to set preferences through an external device or software application and would extend the capabilities of mobile station 500 by providing for information or software downloads to mobile station 500 other than through a wireless communication network. The alternate download path may for example be used to load an encryption key onto the device through a direct and thus reliable and trusted connection to thereby enable secure device communication.

Other communications subsystems 540, such as a short-range communications subsystem, is a further optional component which may provide for communication between mobile station 500 and different systems or devices, which need not necessarily be similar devices. For example, the subsystem 540 may include an infrared device and associated circuits and components or a Bluetooth™ communication module to provide for communication with similarly enabled systems and devices.

When mobile device 500 is operative as a UMTS user equipment, protocol stacks 546 include a UMTS protocol stack for implementing apparatus and method of ciphering in wireless telecommunications user equipment operative with a plurality of radio access networks.

EXTENSIONS AND ALTERNATIVES

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a wireless telecommunications device or UTRAN or other user equipment or access network components, a combination of multiple such components for example in communication with one another or a sub-network or full network of such components.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A method in a wireless telecommunications device operative with a plurality of radio access networks, the method comprising:
   when operating with a first radio access network reading at least one ciphering variable applicable in the second radio access network, when at least one ciphering variable applicable in the second radio access network renders ciphering in the second radio access network infeasible without further authentication, using a substitute value for the ciphering parameter when establishing a connection with the second radio access network;

when the value of the least one ciphering variable is equal to a threshold, writing the threshold value into the variable after the substitute value is sent to the network.

2. A method as claimed in claim 1 wherein the substitute value is a constant.

3. A method according to claim 1 wherein the substitute value is calculated according to the formula THRESHOLD minus y, where THRESHOLD is a threshold value for the ciphering variable, y is one of a randomly generated number comprising a positive integer in the range 1 to (THRESHOLD-1) and a pseudo randomly generated number comprising a positive integer in the range 1 to (THRESHOLD-1).

4. A method as claimed in claim 1 wherein the substitute value is 0000 0000 0000 0000 0010 in binary.

5. A method according to claim 1 wherein the first radio access network is one of a GSM network, a Wifi network, a cdma2000 network, a GPRS network and an EDGE network.

6. A non-transitory computer-readable storage medium having stored thereon instructions which can be executed by a device to carry out the method of claim 1.

7. A wireless communications device operative with a plurality of radio access networks, the device comprising
a transceiver for transmitting and receiving radio signals;
a processor; and
a memory having stored therein: one or more routines executable by the processor, the one or more routines being adapted to:
when operating with a first radio access network reading at least one ciphering variable applicable in the second radio access network,
when at least one ciphering variable applicable in the second radio access network renders ciphering in the second radio access network infeasible without further authentication, using a substitute value for the ciphering parameter when establishing a connection with the second radio access network; and
when the value of the least one ciphering variable is equal to a threshold, writing the threshold value into the variable after the substitute value is sent to the network.

8. A device as claimed in claim 7 wherein the substitute value is a constant.

9. A device according to claim 7 wherein the substitute value is calculated according to the formula THRESHOLD minus y, where THRESHOLD is a threshold value for the ciphering variable, y is one of a randomly generated number comprising a positive integer in the range 1 to (THRESHOLD-1) and a pseudo randomly generated number comprising a positive integer in the range 1 to (THRESHOLD-1).

10. A device according to claim 7 wherein the substitute value is 0000 0000 0000 0000 0010 in binary.

11. A device according to claim 7 wherein the first radio access network that the device is operable with comprises one of a GSM network, a Wifi network, a cdma2000 network, a GPRS network and an EDGE network.

12. A method in a wireless telecommunications device operative with a plurality of radio access networks, the method comprising:
establishing a call with a first radio access network;
reading the value of a second radio access network variable from the device;
when the value of the second radio access network variable in the device is equal to a threshold value, sending a substitute value for the second radio access network variable to the network and, when the value of the second radio access network variable in the device is equal to a threshold value, writing the value of the threshold into the second radio access network variable after the substitute value for the second radio access network variable is sent to the network;
otherwise, sending the value of the second radio access network variable in the device to the network.

13. A non-transitory computer-readable storage medium having stored thereon instructions which can be executed by a device to carry out the method of claim 12.

14. A wireless communications device operative with a plurality of radio access networks, the device comprising
a transceiver for transmitting and receiving radio signals;
a processor; and
a memory having stored therein: one or more routines executable by the processor, the one or more routines being adapted to:
establish a call with a first radio access network;
read the value of a second radio access network variable from the device;
when the value of the second radio access network variable in the device is equal to a threshold value, send a substitute value for the second radio access network variable to the network and, when the value of the second radio access network variable in the device is equal to a threshold value, write the value of the threshold into the second radio access network variable after the substitute value for the second radio access network variable is sent to the network;
otherwise, send the value of the second radio access network variable in the device to the network.

* * * * *